UNITED STATES PATENT OFFICE 2,160,196

SULPHONAMIDE RESIN

Herman A. Bruson and John W. Eastes, Philadelphia, Pa., assignors to The Resinous Products & Chemical Company, Philadelphia, Pa.

No Drawing. Application October 9, 1937, Serial No. 168,171

18 Claims. (Cl. 260—72)

This invention relates to new synthetic resins and their method of manufacture. It deals particularly with synthetic resins made by condensing formaldehyde with aliphatic polysulphonamides and more particularly with alkylene and polyalkylene ether disulphonamides.

While it has been known for many years that sulphonamides condense with formaldehyde to produce resinous compounds, very little work has been done on the development of this type resin using sulphonamides other than para-toluene sulphonamide and related aromatic compounds. The possibility of utilizing aliphatic sulphonamides has been particularly neglected.

The object of this invention is to develop useful resins from aliphatic sulphonamides and we have found that valuable resinous compounds can be obtained by condensing various aliphatic polysulphonamides with formaldehyde. While resinous compounds can also be prepared from aliphatic monosulphonamides they are not readily convertible to the insoluble infusible state. With the aliphatic polysulphonamides, however, sirups are obtained in the early stages of the condensation which progressively go over into tough colorless, insoluble, infusible resins upon continued application of heat.

Aliphatic polysulphonamides can be readily prepared by the method developed by Treat B. Johnson and described in his applications Serial Nos. 72,983 filed April 6, 1936; 136,129 filed April 10, 1937; and 163,184 filed September 10, 1937. Briefly stated, the method consists in treating an alkyl pseudothiourea salt with a halogen to form an alkyl sulphonyl halide which is readily converted to the sulphonamide by reacting with ammonia. The pseudothiourea salts are readily prepared by reacting thiourea with an alcohol and an acid or with an aliphatic halide. By using a polyhydric alcohol or an aliphatic dichloride, dipseudothioureas are obtainable which on conversion give the aliphatic disulphonamides used as starting materials in the present invention.

The condensation with formaldehyde may be carried out under neutral, acid or alkaline conditions or may be started on one side of neutrality and finished on the other side. Thus, during the initial stages of condensation the reaction mixture may be slightly alkaline and during the course of reaction made acidic by the addition of acid. As alkaline condensing agents the alkali hydroxides, ammonia or compounds splitting off ammonia during the reaction such as hexamethylene tetramine can be used. As acid condensing agents organic or inorganic acids such as formic, acetic, hydrochloric, phosphoric, sulphuric, etc., acids may be used.

Depending upon the use to which the resin is to be put the condensation can be carried out without the addition of solvents or in solution, either aqueous or organic. For the preparation of cast products a condensation in the absence of solvent is best suited. When the resin is to be used for impregnating fibrous maetrials such as paper or textiles an aqueous condensation carried to a point where the resin is still soluble followed by an impregnation of the fibrous material and drying of the impregnated material gives a product in which the resin is still in a reactive condition so that it can be molded or laminated in known ways. Molding powders are obtainable either by condensing in the absence of solvent or in solution followed by the removal of the solvent. As the final condensate is an infusible resin, in the preparation of molding compounds the reaction should be stopped before this stage is reached. For the preparation of resins to be used in paints, varnishes and other coating compositions where solubility in organic solvents is important we prefer to carry out the reaction in the presence of an organic solvent particularly in the presence of an alcohol and under anhydrous conditions. By slowly condensing the aliphatic disulphonamides in the presence of an alcohol such as butanol and under anhydrous conditions a product soluble in organic solvents is obtained which although still a reactive resin is substantially completely dehydrated. It may be dissolved in organic solvents and used in the preparation of paints and varnishes or emulsified in water and used in the preparation of a water paint. Emulsions of this type are also valuable as finishing agents for textiles. Condensing in the presence of a substantially but not completely reacted alkyd resin of the fatty oil acid modified type as for instance an alkyd resin made from glycerol; phthalic, maleic or sebacic acid, and ricinoleic acid, likewise gives resins soluble in paint and varnish solvents.

The physical characteristics of the new resins vary, depending upon the conditions of reaction and somewhat on the aliphatic disulphonamide used as starting material. The shorter chain aliphatic disulphonamides when completely condensed with formaldehyde form resins that are materially harder than the tough, rubber products obtained from longer chain aliphatic compounds in which the sulphonamide groups are separated by a greater number of carbon atoms. A still greater range in physical characteristics can be obtained by co-condensing the aliphatic disulphonamides and phenols, urea or thiourea, or a mixture thereof. This may be done either by mixing the sulphonamide and phenol or urea in the desired proportion and condensing the mixture with formaldehyde or a phenolformaldehyde or urea-formaldehyde condensate which is still in a soluble form may be blended with an intermediate soluble aliphatic disulphonamide-formaldehyde resin. In these ways the brittle commercial phenol-formaldehyde resins can be plasticized and toughened or the new aliphatic disulphonamide-formaldehyde resins can be hardened.

In order to illustrate this invention the following examples are given but it should be understood that the invention is not limited to them. The parts referred to in these examples are parts by weight.

*Example 1.*—18 parts of β,β'-disulphonamide-diethyl ether,

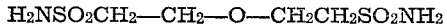

was refluxed for 4 hours with 25 parts of aqueous 30% formaldehyde. A clear, colorless sirup resulted which, if diluted with water, precipitated colorless, transparent droplets. The sirup was evaporated on a steam bath at atmospheric pressure. The residue became more and more viscous as the water was removed, until finally a colorless clear resin resulted.

To facilitate the removal of water and reduce the rate of condensation during the drying the evaporation can be conducted in vacuo or materials forming lower boiling mixtures with water such as butanol may be added. The final product obtained was a tough, somewhat elastic resin insoluble in water and the common organic solvents.

*Example 2.*—10 parts of β,β'-disulphonamide diethyl ether, 10 parts of 30% aqueous formaldehyde and 0.85 parts of 85% phosphoric acid when refluxed for 8 hours and then evaporated on a steam bath gave a resin of the same general appearance as the product of Example 1 but somewhat softer.

*Example 3.*—23 parts of urea, 23 parts of β,β'-disulphonamide diethyl ether, and 37.5 parts of para formaldehyde were heated in the presence of approximately 100 parts of butanol and 0.1 part of formic acid. The butanol and water of condensation were evaporated, separated, and the butanol returned to the reaction mixture. When the amount of water separated indicated the reaction was complete heating was discontinued and the reaction mixture cooled. The product obtained is a butanol solution of a clear, colorless, transparent resin that may be diluted with the usual paint and varnish solvents or emulsified in water with the aid of the usual emulsifying agents. In either form it may be used as a coating composition. The dried film on baking passes over into the insoluble infusible state. This final condensation is accelerated by the addition of acid. The product is tougher and less brittle than a similar product made with urea alone.

The urea of this example may if desired be replaced by an equivalent quantity of the disulphonamide used or any other disulphonamide of the type herein disclosed. Similarly the disulphonamide may be replaced by any other disulphonamide herein disclosed, and the butanol by another mono or polyhydric alcohol. Glycerine, ethylene glycol, the polymers of ethylene glycol, and the lower aliphatic monohydric alcohols such as ethanol come into particular consideration here.

The organic solvent soluble resins made by this or analogous procedures may also be used in admixture with other film forming compounds. They may be used in conjunction with alkyd resins, particularly those modified with fatty acids, in the preparation of enamels and with nitrocellulose or other cellulose ester or ether in making lacquers. The coating compositions prepared with these new resins either with or without the addition of other film forming compounds are useful as either priming or finishing coats for metal or wooden objects.

*Example 4.*—30 parts decane 1-10 disulphonamide, $H_2NSO_2$—$(CH_2)_{10}$—$SO_2NH_2$, and 22 parts 30% aqueous formaldehyde and 50 parts water were refluxed for 8 hours and then evaporated on a steam bath. A clear, colorless, transparent, rubbery resin valuable as a plasticizing agent for phenol-formaldehyde condensation products, urea-formaldehyde condensation products and nitrocellulose was obtained.

By replacing the decane 1-10 disulphonamide with butane 1-4 disulphonamide a similar but somewhat harder product was obtained.

*Example 5.*—A solution containing 10 parts of a brittle heat hardenable phenol-formaldehyde resin was mixed with 12 parts of a still soluble resin prepared as in Example 1. When dried and molded in the usual manner the product resembled molded objects made from 100% phenolic resins but was considerably tougher.

*Example 6.*—A mixture consisting of 22 parts aqueous 30% formaldehyde solution, 0.5 parts ammonium chloride, and 41 parts octadecane-1,12-disulphonamide

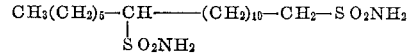

was boiled for 12 hours under reflux with stirring. A soft, pale resin was obtained.

The disulphonamide used in this example was obtained by reacting with chlorine upon an aqueous solution of the di-pseudothiourea hydrochloride obtained by heating thiourea with 1,12-dichlor-octadecane and treating the octadecane-1,12-disulphonchloride thus formed with concentrated ammonium hydroxide. The 1,12-dichloroctadecane was obtained from 1,12-dihydroxyoctadecane prepared by the catalytic hydrogenation of butyl ricinoleate.

The other disulphonamides mentioned in the foregoing examples are obtained by the above mentioned Johnson process using as starting materials the corresponding dichlorides. The butane and decane dichlorides are obtainable from the corresponding dihydric alcohols by treatment with phosphorous trichloride in the presence of pyridine. Other aliphatic polysulphonamides are obtainable in the same way and may be used in place of those mentioned. While the invention contemplates the use of all aliphatic polysulphonamides including ethylene and propylene disulphonamides, those disulphonamides that contain from four to twelve carbon atoms either in a straight or branched chain between the two sulphonamide groups have been found most useful in the preparation of new and the modifying of known resins. Those disulphonamides in which the aliphatic group is a hydrocarbon group or a hydrocarbon chain interrupted by oxygen ether linkages are preferred. These include the pentane, hexane, heptane, octane, and nonane disulphonamides and triethylene ether disulphonamide having the formula—

$$H_2NSO_2CH_2CH_2—O—CH_2CH_2—O—CH_2CH_2—SO_2NH_2$$

In general compounds having the generic formula $$H_2NSO_2—A—SO_2NH_2$$

in which A is an aliphatic group but more particularly an alkylene group or polyalkylene ether group and contains from 4 to 18 carbon atoms may be used as starting materials in practicing this invention.

Formaldehyde should be used in an amount sufficient to react with at least one of the $SO_2NH_2$ groups. A greater quantity is generally desirable. To completely react all the sulphonamide groups one molecular equivalent of formaldehyde should be used for each sulphonamide group. This will require two mols of formaldehyde to one mol of an aliphatic disulphonamide. Frequently a 10 to 25% excess above this amount is desirable. In some instances it may be desirable to replace formaldehyde with another aldehyde such as furfural or benzaldehyde or to use a mixture of formaldehyde with one or more other aldeydes.

Resins of the herein disclosed type may also be made by reacting an aliphatic polysulphonyl chloride with certain ammonium compounds of formaldehyde, such for instance as hexamethylene tetramine and urea-formaldehyde reaction products that have not been condensed to the ultimate final product. Compounds made in this way are to be understood as sulphonamide-formaldehyde condensates within the scope of the appended claims.

The uses to which the herein disclosed products may be put and the various additional ways they can be modified are too numerous to mention here. Among the more common ones are their use in molding and coating compositions both as the primary material and as modifying agent, as impregnating and binding material for laminated fabrics, paper, etc., as bonding agent in the manufacture of plywood, and as finishing materials for textiles. Their transparency, adhesiveness, toughness and compatibility with cellulose esters suggests their use in the manufacture of laminated glass.

Additional uses and modifications of the products herein disclosed will occur from time to time to persons skilled in the art. It is intended that the following claims shall include such modifications when they utilize the principles herein disclosed.

We claim:

1. The process which comprises reacting an aliphatic polysulphonamide with an aldehyde.

2. The process of producing a resinous material which comprises condensing an aliphatic disulphonamide with formaldehyde.

3. The process of producing a resinous material which comprises condensing a member of the group consisting of alkylene and polyalkylene ether disulphonamides with formaldehyde.

4. The process of producing a resinous material which comprises heating an aliphatic disulphonamide with from one to two and a half molecular equivalents of an aldehyde.

5. The process of producing a resinous material which comprises heating a member of the group consisting of alkylene and polyalkylene ether disulphonamides that contain from 4 to 18 carbon atoms in the alkylene or polyalkylene ether groups with formadehyde.

6. The process which comprises heating a solution containing an aliphatic polysulphonamide and formaldehyde.

7. The process which comprises heating a solution containing an aliphatic disulphonamide that contains from 4 to 18 carbon atoms in the aliphatic group and formaldehyde.

8. The process which consists in condensing $\beta,\beta'$-disulphonamide diethyl ether with formaldehyde.

9. The process which comprises heating a solution containing $\beta,\beta'$-disulphonamide diethyl ether and formaldehyde.

10. A new composition of matter comprising the condensation product of an aliphatic polysulphonamide and an aldehyde.

11. A new composition of matter comprising the condensation product of an aliphatic disulphonamide and formaldehyde.

12. A new composition of matter comprising the condensation product of formaldehyde and a member of the group consisting of alkylene and polyalkylene ether disulphonamide.

13. A new composition of matter comprising the condensation product of an aliphatic disulphonamide containing from 4 to 12 carbon atoms between the sulphonamide groups, and formaldehyde.

14. A synthetic resin containing an aliphatic polysulphonamide condensed with an aldehyde.

15. A synthetic resin containing an aliphatic disulphonamide condensed with formaldehyde.

16. A synthetic resin containing an aliphatic disulphonamide that contains from 4 to 18 carbon atoms in the aliphatic group condensed with formaldehyde.

17. A reaction product of formaldehyde and a member of the group consisting of alkylene and polyalkylene ether disulphonamides that contain from 4 to 18 carbon atoms in the alkylene or polyalkylene ether group.

18. A reaction product of formaldehyde and $\beta,\beta'$-disulphonamide diethyl ether.

HERMAN A. BRUSON.
JOHN W. EASTES.